(12) United States Patent
Giraud

(10) Patent No.: US 10,777,028 B2
(45) Date of Patent: Sep. 15, 2020

(54) METHOD FOR ESTIMATING DAMAGE UNDERGONE BY PARTS OF AIRCRAFT LANDING GEARS

(71) Applicant: SAFRAN LANDING SYSTEMS, Vélizy Villacoublay (FR)

(72) Inventor: Frederik Giraud, Vélizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/728,981

(22) Filed: Oct. 10, 2017

(65) Prior Publication Data

US 2018/0114380 A1    Apr. 26, 2018

(30) Foreign Application Priority Data

Oct. 24, 2016   (FR) ...................................... 16 60306

(51) Int. Cl.
| | | |
|---|---|---|
| G07C 5/08 | (2006.01) | |
| G01M 13/045 | (2019.01) | |
| G01M 13/04 | (2019.01) | |
| B64C 25/36 | (2006.01) | |
| B64C 25/40 | (2006.01) | |
| B64D 45/00 | (2006.01) | |

(52) U.S. Cl.
CPC ............. *G07C 5/0808* (2013.01); *B64C 25/36* (2013.01); *G01M 13/04* (2013.01); *G01M 13/045* (2013.01); *G07C 5/0841* (2013.01); *B64C 25/405* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 2006/0220917 A1* | 10/2006 | Nance ..................... | B64C 25/00 340/960 |
| 2010/0276535 A1 | 11/2010 | Charuel et al. | |
| 2016/0052642 A1 | 2/2016 | Gordon et al. | |
| 2016/0223431 A1* | 8/2016 | Summers ............ | G01M 17/013 |

FOREIGN PATENT DOCUMENTS

| | | |
|---|---|---|
| EP | 2 243 703 A1 | 10/2010 |
| EP | 3 051 267 A | 8/2016 |

OTHER PUBLICATIONS

French Preliminary Search Report for FR 16 60306, dated May 18, 2017.
French Written Opinion for FR 16 60306, dated Oct. 24, 2016.

* cited by examiner

*Primary Examiner* — Abdhesh K Jha
(74) *Attorney, Agent, or Firm* — Sughrue Mion, PLLC

(57) ABSTRACT

A method for estimating the damage to rotational driving actuators of the wheels borne by aircraft undercarriages. First, in service, recording data relating to the driving actuators, in particular data on torque developed by the driving actuators, on speed of rotation of the motors of the driving actuators, on number of revolutions of the motors. Then, deducing therefrom damage undergone by the driving actuators. Finally, estimating a remaining life of the driving actuators.

2 Claims, 1 Drawing Sheet

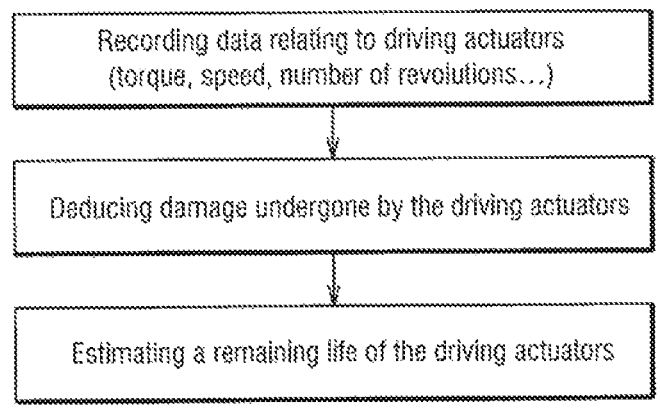

METHOD FOR ESTIMATING DAMAGE UNDERGONE BY PARTS OF AIRCRAFT LANDING GEARS

The invention relates to a method for estimating the damage undergone by parts of aircraft landing gears.

BACKGROUND OF THE INVENTION

Aircraft are known in which the undercarriages are provided with actuators for rotationally driving the wheels to allow the movement of the aircraft without using the power units of the aircraft. The undercarriages are dimensioned to withstand various fatigue stresses, in particular landing, turning and braking loads, but also wheel driving loads. For this last part of the fatigue spectrum, it is known that the torques applied in driving the wheels are the source of most of the damage to these actuators, but also to a part of the undercarriage in direct interaction with actuators.

SUBJECT OF THE INVENTION

The invention aims to propose a method for estimating the damage undergone by aircraft landing gear parts, in particular the wheel driving actuators.

BRIEF DESCRIPTION OF THE DRAWINGS

The sole drawing is a flowchart illustrating the process for damage estimation.

DESCRIPTION OF THE INVENTION

In order to achieve this aim, a method is proposed for estimating the damage to actuators rotationally driving the wheels borne by undercarriages that make up the landing gear, the method comprising according to the invention the steps of:

in service, recording data relating to the driving actuators, in particular data on torque developed by the driving actuators, on speed of rotation of the motors of the driving actuators, on number of revolutions of the motors;

deducing therefrom damage undergone by the driving actuators;

estimating a remaining life of the driving actuators.

The method of the invention can be implemented in real time by one of the computers of the aircraft, or staggered. The data are then recorded on board the aircraft then transmitted to an external computer to estimate the damage to the driving actuators and the undercarriage and deduce therefrom a remaining life of the actuators.

Preferably, the data originate directly from the control module of the driving actuators. If necessary, it will be possible to complement the recorded data with data originating from sources other than the control module of the driving actuators, such as accelerometers borne by the undercarriage.

Above and beyond the real-time tracking of the driving actuators, the knowledge of the stress spectra undergone by the driving actuators makes it possible to determine inspection intervals, to simplify the certification of these actuators by constructing a representative database, and to possibly work back to the source of an in-service problem affecting the driving actuators.

It goes without saying that knowledge of the stress spectrum also makes it possible to track the damage to parts of the undercarriage bearing the driving actuators or undergoing the effects of their actions.

The invention claimed is:

1. A method for estimating the damage to part of an aircraft landing gear, in particular to driving actuators rotationally driving the wheels borne by undercarriages that make up the landing gear, the method comprising:

in service, recording data relating to the driving actuators, comprising data from at least one accelerometer detecting such data on at least one of (1) torque developed by the driving actuators, (2) speed of rotation of the motors of the driving actuators, and (3) number of revolutions of the motors;

determining from said recorded data a stress undergone by the driving actuators and deducing therefrom from said stress the damage undergone by the driving actuators; and estimating a remaining life of the driving actuators.

2. The method according to claim 1, wherein other data are also recorded, originating from sources other than the accelerometer.

* * * * *